United States Patent
Lee et al.

(10) Patent No.: US 8,851,814 B2
(45) Date of Patent: Oct. 7, 2014

(54) SELF-PIERCING RIVET

(71) Applicant: Sungwoo Hitech Co., Ltd., Busan (KR)

(72) Inventors: Mun Yong Lee, Busan (KR);
Byung-Jun Park, Busan (KR)

(73) Assignee: Sungwoo Hitech Co., Ltd., Busan (KR)

( * ) Notice: Subject to any disclaimer, the term of this patent is extended or adjusted under 35 U.S.C. 154(b) by 106 days.

(21) Appl. No.: 13/629,655

(22) Filed: Sep. 28, 2012

(65) Prior Publication Data

US 2013/0315690 A1    Nov. 28, 2013

(30) Foreign Application Priority Data

May 25, 2012   (KR) .................. 10-2012-0056303

(51) Int. Cl.
*F16B 19/08*    (2006.01)

(52) U.S. Cl.
USPC .......................................... 411/501; 411/504

(58) Field of Classification Search
USPC .................. 411/501, 504, 168, 179, 386, 387
IPC ....................................................... F16B 09/86
See application file for complete search history.

(56) References Cited

U.S. PATENT DOCUMENTS

| | | | | |
|---|---|---|---|---|
| 2,194,458 A | * | 3/1940 | Eckler | 411/504 |
| 2,563,107 A | * | 8/1951 | Fanger | 219/94 |
| 3,453,927 A | * | 7/1969 | Moore | 411/29 |
| 3,562,700 A | * | 2/1971 | Miller | 439/742 |
| 6,796,759 B2 | * | 9/2004 | Aasgaard | 411/29 |
| 6,802,682 B2 | * | 10/2004 | Stevenson et al. | 411/501 |
| 8,550,759 B2 | * | 10/2013 | Clinch et al. | 411/171 |

FOREIGN PATENT DOCUMENTS

| | | |
|---|---|---|
| EP | 1420173 | 5/2004 |
| FR | 1300424 | 8/1962 |
| GB | 955813 | 4/1964 |
| JP | 10-501744 | 2/1998 |
| JP | 2001-132718 | 5/2001 |

\* cited by examiner

*Primary Examiner* — Gary Estremsky
(74) *Attorney, Agent, or Firm* — Lexyoume IP Meister, PLLC

(57) ABSTRACT

A self-piercing rivet is disclosed. The self-piercing rivet integrally joins an upper plate member and a lower plate member overlapping each other. The self-piercing rivet includes a head portion, a shank portion integrally connected with the head portion, and a plurality of ribs formed to an external circumferential surface of the shank portion along a length direction of the shank portion in a spiral form.

17 Claims, 11 Drawing Sheets

US 8,851,814 B2

SELF-PIERCING RIVET

CROSS-REFERENCE TO RELATED APPLICATION

This application claims priority to and the benefit of Korean Patent Application No. 10-2012-0056303 filed in the Korean Intellectual Property Office on May 25, 2012, the entire contents of which are incorporated herein by reference.

BACKGROUND OF THE INVENTION (a) Field of the Invention

The present invention relates to a self-piercing rivet. More particularly, the present invention relates to a self-piercing rivet that can join two or more objects.

(b) Description of the Related Art

Automotive industries pay attention to environmental problems, and apply aluminum alloys and plastic materials to a vehicle body so as to reduce weight of the vehicle body and to improve fuel consumption being one of solutions that solves the environmental problems.

For these purpose, joining methods for assembling the vehicle body instead of conventional spot welding have been researched and developed.

Recently, a self-piercing rivet using a self-piercing rivet system has been increasingly used.

According to a conventional riveting technique, joining objects such as steel sheets are joined by forming a head portion after a riveting hole is bored and a rivet is inserted into the riveting hole. However, the rivet is press-fitted into the joining objects by hydraulic pressure or pneumatic pressure without forming the riveting hole according to the self-piercing rivet technique. At this time, the rivet is plastically deformed and joins the joining objects.

A self-piercing rivet is used for joining metal sheets according to the self-piercing rivet technique, and the self-piercing rivet includes a head and a partially hollow cylindrical shank.

For example, a shank of the self-piercing rivet penetrates an upper sheet by a punch of a setting tool. At this time, the shank is supported by a die and is deformed outwardly. In addition, since the shank is press-fitted to a lower sheet in a state that the head portion is supported by the upper sheet, the upper sheet and the lower sheet are joined.

Conventionally, the punch is provided to an upper portion of a C-type frame and an anvil is provided to a lower portion of the C type frame.

In a conventional art, two joining objects are disposed between the punch and the anvil and then the rivet is press-fitted by the punch, pierced the upper joining object, encapsulated at the lower joining object, and deformed outwardly by a forming cavity of the anvil, and thus the joining objects are integrally connected.

The joining technic using the self-piercing rivet may be applied for assembling aluminum panels of a vehicle body which is not easily applied by spot welding.

Also, the self-piercing rivet system may provide excellent rigidity and resistance characteristic against fatigue, and may not form distortion on a sheet near the rivet so that the self-piercing rivet system may be acceptable from an aesthetic point of view.

However, in a conventional art, a shank of the self-piercing rivet (hereinafter called a "rivet") pierces the upper joining object, encapsulated at the lower joining object, and deformed outwardly by the anvil, and thus the rivet may not be easily separated from the joining objects.

That is, in the conventional art, if it is required to separate the joining objects from each other, the rivet needs to be dismantled or the riveting portion needs to be torn, and thus the joining objects are damaged and deformed. Therefore, the joining objects may be replaced without recycling.

Also, in the conventional art, since the punch and the anvil are used for press-fitting the rivet to join the joining objects, an applicable degree of freedom of riveting may be deteriorated due to interference with other equipment.

Since the shank of the conventional self-piercing rivet is formed as an annular piercing edge, a penetrated portion of the upper sheet is completely cut off by the annular edge when the shank penetrates the upper sheet and is press-fitted to the lower sheet.

Since the penetrated portion of the upper sheet cut off by the shank cannot form a mechanical interlock of the upper and lower sheets and remains as dead metal, joining strength of the upper and lower sheets may be deteriorated.

In addition, since the dead metal cannot join the upper and lower sheets with sufficient strength, the upper sheet relatively rotates with respect to the lower sheet.

Accordingly, various techniques for preventing rotation of the upper sheet are applied according to conventional arts. For example, a plurality of rivets are used for preventing the rotation of the upper sheet.

If the plurality of rivets are used, processes may be complicated, productivity may be deteriorated, and product cost may be increased due to an increase of processes and components.

Since the shank of the rivet is formed as the annular piercing edge, the shank penetrates the upper sheet with an annular shape, and thereby increases a joining load according to conventional arts.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a self-piercing rivet having advantages of easy separation of the rivet by improving a shape of a shank.

The present invention has been made in an effort to provide a self-piercing rivet having further advantages that joining load and press capacity may be reduced but shear strength may be enhanced, and interference with other equipment is reduced by allowing one-side riveting using a punch so as to improve degree of freedom of riveting.

The present invention has been made in an effort to provide a self-piercing rivet having advantages that a penetrated portion reinforces joining strength of joining objects by improving a shape of a shank so as to not cut off the penetrated portion completely.

The present invention has been made in an effort to provide a self-piercing rivet having advantages of preventing relative rotation of joining objects using the penetrated portion that is not cut off completely even though just one rivet is used.

A self-piercing rivet according to exemplary embodiments of the present invention integrally joins an upper plate member and a lower plate member overlapping each other.

In one or more exemplary embodiments, the self-piercing rivet includes a head portion, a shank portion integrally connected with the head portion, and a plurality of ribs formed to an external circumferential surface of the shank portion along a length direction of the shank portion in a spiral form.

In one or more exemplary embodiments, the ribs are integrally connected with the head portion and are disposed at the external circumferential surface of the shank portion with an even distance therebetween.

In one or more exemplary embodiments, the shank portion is a solid circular cylinder.

In one or more exemplary embodiments, the shank portion has a connecting end connected to the head portion and a free end being an opposite end of the connecting end, and the ribs are formed from the connecting end to the free end in a spiral form.

In one or more exemplary embodiments, the free end of the shank portion is flat.

In one or more exemplary embodiments, the free end of the shank portion is formed as a cone.

In one or more exemplary embodiments, the rib has a rib surface with width (B) and side surfaces with thickness (T) between the external circumferential surface of the shank portion and the rib surface.

In one or more exemplary embodiments, the thickness (T) is larger than the width (B).

In one or more exemplary embodiments, the thickness (T) satisfies a relationship with an exterior diameter (D) of the shank portion as T={(1/2.66)−1/2}D.

In one or more exemplary embodiments, the ribs rotate along the length direction of the shank portion in a clockwise direction in a spiral form.

In one or more exemplary embodiments, the ribs rotate along the length direction of the shank portion in anti-clockwise direction in a spiral form.

In one or more exemplary embodiments, the self-piercing rivet plastically deforms riveting target portions of an upper plate member and a lower plate member overlapped with each other and integrally joined; and the ribs rotate and pierce the upper plate member, and are plastically deformed within the lower plate member.

In one or more exemplary embodiments, the self-piercing rivet is rotated according to the ribs along the spiral direction during piercing, and integrally joins the upper and lower plate members.

In one or more exemplary embodiments, the self-piercing rivet is able to be separated from the riveting target portion of the upper and lower plate members by a torque applied to the opposite spiral direction of the ribs.

In one or more exemplary embodiments, a helix of the ribs and an axial line of the shank portion is between 10-45°.

In one or more exemplary embodiments, an upper plate member and a lower plate member that are to be joined are made of the same materials.

In one or more exemplary embodiments, an upper plate member and a lower plate member that are to be joined are made of different materials.

A self-piercing rivet according to another aspect of the present invention includes: a head portion; a shank portion integrally connected with the head portion and having a connecting end connected to the head portion and a free end being an opposite end of the connecting end; and a plurality of ribs formed to an external circumferential surface of the shank portion from the connecting end to the free end in a spiral form, wherein if at least one hole is formed to a riveting target portion of upper and lower plate members, the self-piercing rivet plastically deforms riveting target portions of an upper plate member and a lower plate member that are overlapped with each other to be integrally joined, and the ribs rotate and tear the edge of the hole and are plastically deformed within the other targeting portion.

A self-piercing rivet according to another aspect of the present invention includes: a head portion; a shank portion integrally connected with the head portion and having a connecting end connected to the head portion and a free end being an opposite end of the connecting end; and a plurality of ribs formed to an external circumferential surface of the shank portion from the connecting end to the free end in a spiral form, wherein if holes are formed to each riveting targeting portion of the upper and lower plate members, the ribs rotate and tear the edge of the hole of the upper plate member, and the ribs pierce an interior circumference of the edge of the hole of the lower plate member and are plastically deformed within the lower plate member.

In one or more exemplary embodiments, the ribs piercing the upper and lower plate members form a flat surface to a lower surface of the lower plate member.

In one or more exemplary embodiments, since the ribs are formed to have a shank portion in a spiral form, the rivet may rotate during press-fitting to join the joining objects and the self-piercing rivet is able to be separated from the riveting target portion of the joining objects by a torque applied to the opposite spiral direction of the ribs.

Thus, in one or more exemplary embodiments, if it is required to separate the joining objects from each other, the rivet may be easily separated without being dismantled or tearing the riveting portion, so the joining objects may be recycled.

In one or more exemplary embodiments, since the spiral ribs are formed to the shank portion, the entire surface area of the rivet may be increased, shear strength with respect to the upper and lower plate members may be enhanced, a joining load and press capacity to joining objects may be reduced, and thus operating stability of the self-piercing rivet system may be enhanced.

In one or more exemplary embodiments, since a die provided with a receiving portion may be used for just supporting the joining objects, a separated anvil of a conventional art is not required, so interference may be minimized and a degree of freedom of riveting may be improved.

In one or more exemplary embodiments, upper and lower plate members provided with holes formed to the riveting target portion may be joined by riveting, and thus the die does not need to be provided with a receiving portion such as hole or a groove, and a lower surface of the lower plate member may be flat.

Therefore, in one or more exemplary embodiments, the flat lower surface of the lower plate member may satisfy needs of the vehicle manufacturing industry which prefers joining objects without protrusions.

In one or more exemplary embodiments, since the penetrated portion is not cut off completely even though just one rivet is used, relative rotation of joining objects may be prevented and joining strength of the joining objects may be enhanced.

In one or more exemplary embodiments, since one or very few rivets may join the joining objects, productivity may be improved and manufacturing cost may be reduced by reducing riveting processes and element numbers.

BRIEF DESCRIPTION OF THE DRAWINGS

The drawings illustrate exemplary embodiments of the present invention and are not construed to limit any aspect of the invention.

DESCRIPTION OF SYMBOLS

Figure 1:
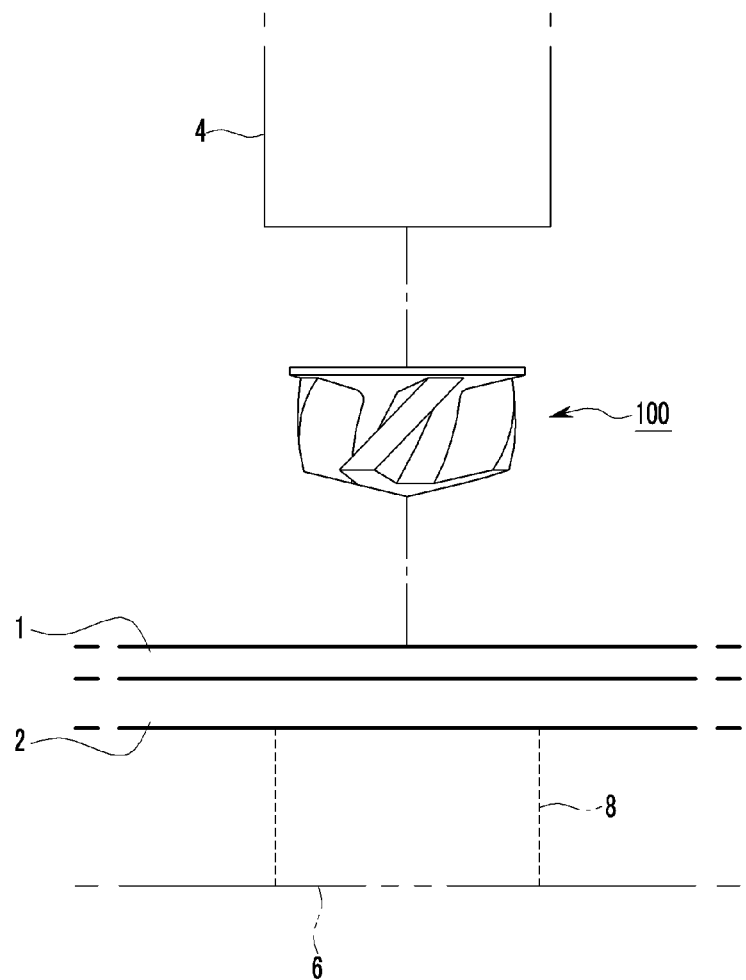
FIG. 1 is a drawing showing a self-piercing rivet according to an exemplary embodiment of the present invention.

1 . . . upper plate member
2 . . . lower plate member
4 . . . punch unit
6 . . . die
8 . . . receiving portion
10 . . . head portion
30 . . . shank portion
31 . . . protruding surface
50 . . . rib
51 . . . spiral
53 . . . rib surface
55 . . . rib side surface

DETAILED DESCRIPTION OF THE EMBODIMENTS

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Description of components that are not necessary for explaining the present invention will be omitted, and the same constituent elements are denoted by the same reference numerals in this specification.

In addition, size and thickness of components shown in the drawings may be differ from real size and real thickness of the components for better comprehension and ease of description. Therefore, the present invention is not limited to those shown in the drawings.

In the detailed description, ordinal numbers are used for distinguishing constituent elements having the same terms, and have no specific meanings.

In the specification, unless explicitly described to the contrary, the word "comprise" and variations such as "comprises" or "comprising" will be understood to imply the inclusion of stated elements but not the exclusion of any other elements.

In the specification, terms such as "portion" and "means" mean a unit of a comprehensive element having at least one function or movement.

FIG. 1 is a drawing showing a self-piercing rivet according to an exemplary embodiment of the present invention.

In the specification, joining objects may be defined as basic materials for joining with a rivet, and a joined article may be defined as a processed article of which the joining objects are joined by riveting.

Referring to FIG. 1, a self-piercing rivet 100 according to an exemplary embodiment of the present invention joins at least two metal sheets (hereinafter called a "rivet").

It is exemplified in this specification that two metal sheets are used, and the two metal sheets are called an upper plate member 1 and a lower plate member 2, respectively.

In the specification, an upper surface or a top surface will be defined as an upward surface in the drawings, and a lower surface or a bottom surface will be defined as a downward surface in the drawings.

One sheet of the first and second sheets 1 and 2 disposed to an upper position of the drawings will be denoted as the upper plate member 1, and the other sheet will be denoted as the lower plate member 2 for better comprehension. Although other plate members may be disposed between the upper plate member 1 and the lower plate member 2, the self-piercing rivet 100 will be described for joining the upper plate member 1 and the lower plate member 2 for better comprehension.

The terms described above are defined for better comprehension, and thus the terms may not limit the spirit or scope of the present invention and other definitions may be situationally used in the specification for better comprehension.

The self-piercing rivet 100 may join joining objects such as the upper and lower plate members 1 and 2 that are overlapped through a self-piercing rivet system.

That is, the self-piercing rivet system press-fits the rivet 100 into the upper plate member 1 and the lower plate member 2 overlapped with each other with a predetermined pressure, and is adapted to join the upper plate member 1 and the lower plate member 2 by plastic deformation of the upper plate member 1, the lower plate member 2, and the rivet 100.

In an exemplary embodiment of the present invention, the upper plate member 1 and the lower plate member 2 are made of a plastic material, a rubber material, an aluminum sheet, or a steel sheet (including a high-tension steel sheet).

The upper plate member 1 and the lower plate member 2 can be made of the same material or different materials.

The self-piercing rivet system of which the self-piercing rivet 100 according to an exemplary embodiment of the present invention is applicable may be provided to a robot, and may include a punch unit 4 for pressing the rivet 100 and a die 6 for supporting the upper and lower plate members 1 and 2 that overlap each other.

The punch unit 4 feeding the rivet 100 includes a punch cylinder driven by hydraulic pressure or pneumatic pressure, and a punch operated by the punch cylinder.

The punch unit 4 may use a hitting apparatus for speedy and continuous impacting of the rivet 100.

The punch unit 4 of the self-piercing rivet system is a well-known to be applied to an SPR (Self-Piercing Riveting) system, and thus a detailed description thereof will be omitted in this specification.

In an exemplary embodiment of the present invention, the die 6 supporting and absorbing an impact force during the rivet driving operation may be mounted to a conventional C-type frame such as an anvil die, or the die 6 may be a separate plate-type structure for supporting the overlapped upper and lower plate members 1 and 2.

In the die 6, a receiving portion 8 is formed as a hole or a dome for receiving a plastically deformed portion of a predetermined riveting target portion of the upper and lower plate members 1 and 2. In an exemplary embodiment of the present invention, the receiving portion 8 of the die 6 is a hole as shown in the drawings for better comprehension.

The receiving portion 8 receives a plastically deformed portion of the predetermined riveting target portion of the upper and lower plate members 1 and 2.

In an exemplary embodiment of the present invention, the riveting target portion of the upper and lower plate members 1 and 2 may be flat without a hole.

The rivet 100 according to an exemplary embodiment of the present invention applicable to the self-piercing rivet system penetrates the upper plate member 1 by pressing of the punch unit 4, is press-fitted into the lower plate member 2, and plastically deforms the upper and lower plate members 1 and 2 though the receiving hole 8 of the die 6 so as to integrally join the upper plate member 1 and the lower plate member 2.

Hereinafter, the self-piercing rivet 100 according to an exemplary embodiment of the present invention will be described in detail referring to FIG. 1 and accompanying drawings.

Figure 2:
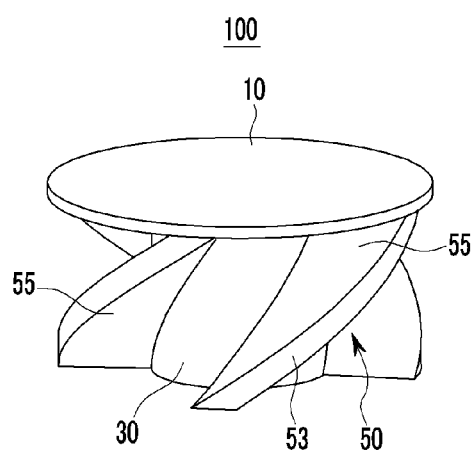
FIG. 2 is a perspective view of a self-piercing rivet according to an exemplary embodiment of the present invention.
Figure 3:
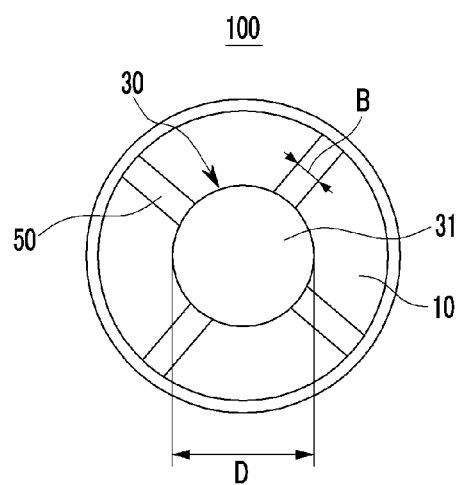
FIG. 3 is a bottom view of a self-piercing rivet according to an exemplary embodiment of the present invention.
Figure 4:
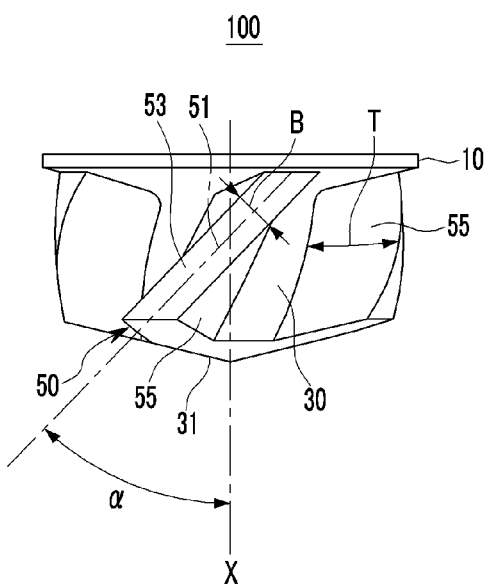
FIG. 4 is a front view of a self-piercing rivet according to an exemplary embodiment of the present invention.

FIG. 2 is a perspective view of a self-piercing rivet according to an exemplary embodiment of the present invention, FIG. 3 is a bottom view of a self-piercing rivet according to an exemplary embodiment of the present invention, and FIG. 4 is a front view of a self-piercing rivet according to an exemplary embodiment of the present invention.

Referring to FIG. 1 to FIG. 4, the self-piercing rivet 100 according to an exemplary embodiment of the present invention basically includes a head portion 10, a shank portion 30, and ribs 50, and each component will be described in detail.

The head portion 10 receives a load of the punch unit 4 and has a disk shape with a predetermined thickness.

The head portion 10 may support the riveting target portion of the upper plate member 1 when the rivet 100 plastically deforms the upper and lower plate members 1 and 2 that overlap each other.

In an exemplary embodiment of the present invention, the shank portion 30 plastically deforms the riveting target portion of the upper and lower plate members 1 and 2 that overlap each other, and is integrally connected with a lower portion of the head portion 10.

The shank portion 30 may be a solid circular cylinder and thus buckling may not occur during pressing of the punch unit 4.

Hereinafter, a connected portion of the shank portion 30 to the head portion 10 will be denoted as a connecting end, and an opposite portion of the shank portion 30 will be denoted as a free end.

The length of the shank portion 30 may vary according to thickness of the upper and lower plate members 1 and 2 and so on, and thus in an exemplary embodiment of the present invention the length of the shank portion 30 may not be limited to specific ranges.

In an exemplary embodiment of the present invention, a cone-shaped protruding surface 31 may be formed to the free end of the shank portion 30. The protruding surface 31 may be formed at a predetermined angle (about 152°) from an edge of the free end.

The cone shaped protruding surface 31 formed to the free end may increase the contact area of the shank portion 30 with respect to the riveting target portion of the upper and lower plate members 1 and 2 so as to easily plastically deform the riveting target portion.

In an exemplary embodiment of the present invention, the ribs 50 are adapted to plastically deform the riveting target portion of the upper and lower plate members 1 and 2 with the shank portion 30 by pressing of the punch unit 4, penetrate the upper plate member 1, pierce the upper and lower plate members 1 and 2, and be plastically deformed.

Also, the rib 50 is adapted to rotate the rivet 100 during plastic deformation of the riveting target portion of the upper and lower plate members 1, penetrating the upper plate member 1 and piercing the upper and lower plate members 1 and 2 by changing pressure of the punch unit 4 to torque.

That is, the ribs 50 induces the rivet 100 to be rotated during penetration of the upper plate member 1 and piercing the lower plate member 2, and is plastically deformed and encapsulated within the lower plate member 2 so as to join the upper and lower plate members 1 and 2.

The ribs 50 according to an exemplary embodiment of the present invention integrally protrude from an external circumferential surface of the shank portion 30 and are disposed in a spiral form along the length direction of the shank portion 30.

There are multiple ribs 50, and they are disposed at the external circumferential surface of the shank portion 30 at even distances.

In detail, the ribs 50 according to an exemplary embodiment of the present invention are integrally connected with the head portion 10, are formed from the connecting end to the free end of the shank portion 30 in a spiral from, and are disposed along a circular arc of the shank portion 30 at even distances.

The ribs 50 are formed from the connecting end to the free end of the shank portion 30 to form a spiral 51 (in the drawing, it is denoted as a one-point chain line). For example, the ribs 50 rotate along the length direction of the shank portion 30 in a clockwise direction to form the spiral 51.

In an exemplary embodiment of the present invention, the lead angle $\alpha$ of the spiral 51 may be 10-45°. That is, the helix of the ribs 50 and an axial line X of the shank portion 30 form an angle between 10-45°.

In this case, the lead angle $\alpha$ means an angle between the spiral 51 along the connecting end and the free end of shank portion 30, and the axial line X of the shank portion 30, and it is also called the helix angle.

For example, in an exemplary embodiment of the present invention, the ribs 50 forms a 45° lead angle with respect to the axial line X of the shank portion 30 and four spirals 51 along the connecting end and the free end of the shank portion 30.

The lead angle and number of spirals of the ribs 50 are set within such range that the ribs 50 may plastically deform the riveting target portion of the upper and lower plate members 1 and 2, penetrate the upper plate member 1, pierce the upper and lower plate members 1 and 2, and be plastically deformed. In one or more exemplary embodiments of the preset invention, the lead angle and the number of spirals of the ribs 50 can be set through various simulation tests.

If the lead angle of the rib 50 is less than 10°, the length of the ribs 50 is not sufficient such that the relative amount of the ribs 50 that penetrate the upper plate member 1 and is encapsulated within the lower plate member 2 is not sufficient. Therefore, joining force (connecting force) of the ribs 50 with respect to the upper and lower plate members 1 and 2 may not be sufficient.

Also, if the lead angle of the rib 50 is less than 10°, the number of ribs 50 formed to the external circumference direction of the shank portion 30 may be increased, and thus the encapsulated portion of the upper and lower plate members 1 and 2 which would be positioned between the ribs 50 may be reduced, so the joining force (connecting force) of the ribs 50 with respect to the upper and lower plate members 1 and 2 may be reduced.

On the contrary, if the lead angle of the ribs 50 is over 45°, for example 60°, manufacturing of the ribs 50 may be difficult. Also, at the instance that the ribs 50 with the shank portion 30 plastically deform the riveting target portion of the upper and lower plate members 1 and 2, ends of the ribs 50 may be plastically deformed without piercing the upper plate member 1 and the joining objects may not be sufficiently joined.

Thus, in one or more exemplary embodiments, the lead angle of the ribs 50 is set within such range that the ribs 50 may plastically deform the riveting target portion of the upper and lower plate members 1 and 2, penetrate the upper plate member 1, pierce the upper and lower plate members 1 and 2, and be plastically deformed. In one or more exemplary embodiments of the preset invention, the lead angle can be set to less than 45°.

The lead angle and number of spirals of the ribs 50 can be set through various simulation tests.

The spiral length of the ribs 50 may vary according to the length of the shank portion 30, the thickness of the upper and lower plate members 1 and 2, the lead angle, and so on, and thus in an exemplary embodiment of the present invention, the spiral length of the ribs 50 may not be limited to specific ranges.

Each rib 50 has a rib surface 53 with width B and rib side surfaces 55 with thickness T between the external circumferential surface of the shank portion 30 and the rib surface 53.

In one or more exemplary embodiments, the thickness T of the rib 50 is larger than the width B of the rib 50.

The thickness T satisfies a relationship with an exterior diameter D of the shank portion 30 as follows:

$$T = \{(1/2.66) - 1/2\}D.$$

For example, if the exterior diameter D of the shank portion 30 is 4 mm, the thickness T of the rib side surface 55 may be determined as 1.5-2 mm, and the width B of the rib surface 53 may be determined to be less than the thickness T, for example as 1 mm.

The relationship of the thickness T of the rib side surface 55, the width B of the rib surface 53, and the exterior diameter D of the shank portion 30 are determined for preventing premature deformation of the ribs 50 due to pressing of the punch unit 4 before piercing the riveting target portion of the upper plate members 1, so the ribs 50 may not pierce the upper plate member 1.

Also, the relationship of the thickness T of the rib side surface 55, the width B of the rib surface 53, and the exterior diameter D of the shank portion 30 may induce the ribs 50 to be encapsulated with a sufficient encapsulated area (surface) within the lower plate member 2.

If the thickness T of the rib side surface 55 is less than that according to the relationship, the area of the ribs 30 to be encapsulated within the lower plate member 2 may not be sufficient and the deformation may not sufficiently occur at ends of the ribs 30 so the joining objects may not be sufficiently joined.

If the thickness T of the rib side surface 55 is larger than that according to the relationship, the ends of ribs 30 may be prematurely deformed due to pressing of the punch unit 4 before piercing the riveting target portion of the upper plate members 1, so the ribs 50 may not pierce the upper plate member 1.

The predetermined condition or the relationship of the width B of the rib surface 53 and the thickness T of the rib side surface 55 can be set through various simulation tests.

The rib surface 53 may be formed corresponding to the external circumferential surface of the shank portion 30 and the free end of which may be sharply formed.

With this structure, rigidity of the rib 50 may be enhanced such that the ends of which are not plastically deformed before piercing the riveting target portion of the upper plate member 1.

Hereinafter, operations of the self-piercing rivet 100 will be described in detail referring to the drawings.

Figure 5:
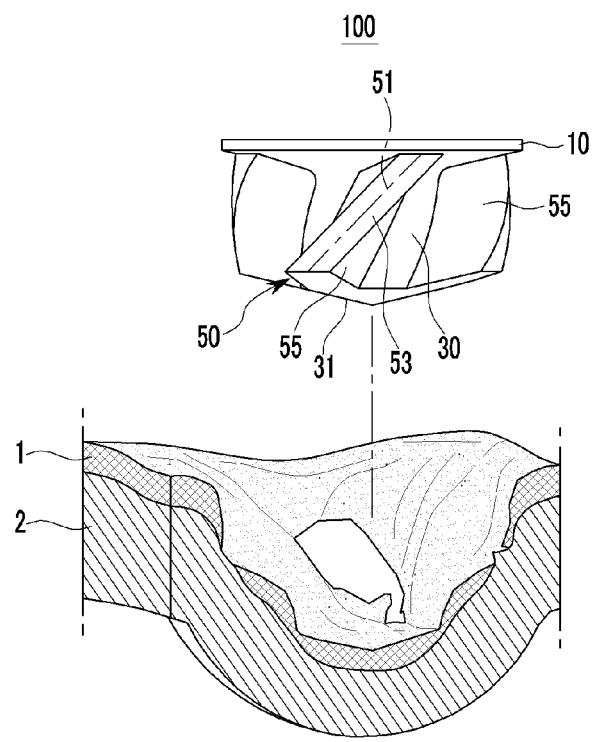
FIG. 5 is a drawing showing an operation of a self-piercing rivet according to an exemplary embodiment of the present invention.

FIG. 5 is a drawing showing an operation of a self-piercing rivet according to an exemplary embodiment of the present invention.

Referring to FIG. 5 and the above said drawings, the upper and lower plate members 1 and 2 overlapping each other are set on the plate-type die 6.

In one or more exemplary embodiments, the die 6 may not be an anvil provided to a conventional C-type frame. The die 6 may be a separated plate-type structure for supporting the overlapped upper and lower plate members 1 and 2.

The riveting target portion of the upper and lower plate members 1 and 2 may not have holes and may be disposed on the receiving portion 8 of the die 6.

At that state, the punch unit 4 of the self-piercing rivet system is moved toward the riveting target portion of the upper and lower plate members 1 and 2 and the rivet 100 is fed to the punch unit 4.

Then, the cylinder of the punch unit 4 driven by hydraulic pressure or pneumatic pressure is operated for the punch to press the head portion 10 of the rivet 100.

Then the ribs 50 together with the shank portion 30 plastically deform the riveting target portion of the upper and lower plate members 1 and 2.

In one or more exemplary embodiments, the cone-shaped protruding surface 31 formed to the free end of the shank portion 30 may allow an increase in contact area of the shank portion 30 with respect to the riveting target portion of the upper and lower plate members 1 and 2 so as to easily plastically deform the riveting target portion.

In one or more exemplary embodiments, since the thickness T of the rib 50 is larger than the width B of the rib 50 and the thickness T satisfies the relationship with an exterior diameter D of the shank portion 30 as $T = \{(1/2.66) - 1/2\}D$, premature deformation of the ribs 50 before piercing the riveting target portion of the upper plate members 1 may be prevented.

When the riveting target portion of the upper and lower plate members 1 and 2 is deformed plastically, the deformed portion of the riveting target portion may be protruded from the lower surface of lower plate member 2 and received in the receiving portion 8 of the die 6.

At this moment, the ends of the ribs 50 pierce the upper plate member 1 by pressing of the punch unit 4 and it is plastically deformed within the lower plate member 2.

In one or more exemplary embodiments, the ribs 50 forming the spirals 51 from the connecting end to the free end induce the rivet 100 to be rotated from the moment of penetrating the upper plate member 1, pierce the lower plate member 2, and by plastically deformed and encapsulated within the lower plate member 2 so as to join the upper and lower plate members 1 and 2 due to the torque.

That is, the ribs 50 may change the pressing force received from the punch unit 4 to the torque.

In one or more exemplary embodiments, the ribs 50 plastically deform the riveting target portion of the upper and lower plate members 1 and 2 with the shank portion 30, the ends of which rotate and penetrate the upper plate member 1, pierce the upper and lower plate members 1 and 2, and are plastically deformed so as to integrally join the upper and lower plate members 1 and 2.

The ends of the ribs 50 are encapsulated within the lower plate member 2 being plastically deformed so as to form a mechanical interlock of the upper and lower plate members 1 and 2.

In one or more exemplary embodiments, since the rotating rivet 100 penetrates the upper plate member 1 and pierces the lower plate member 2, the deformed portion of the upper plate member 1 corresponding to a space between the ribs 50 may be connected with each other.

That is, although the ends of the ribs 50 penetrate the upper plate member 1, the riveting target portion of the upper plate member 1 is not completely separated, so the riveting target portions of the upper plate member 1 except for the penetrated portion may be connected to each other. That is, dead metal may not be formed.

Since dead metal that is completely cut off may not remain, the deformed portion of the riveting target portion of the upper plate member 1 is used for reinforcing joining strength of the upper plate member 1 and the lower plate member 2.

The deformed portion of the upper plate member 1 is used for generating mechanical interlock of the upper plate member 1 and the lower plate member 1 and 2, and attaching the upper plate member 1 and the lower plate member 2 with a predetermined strength.

Accordingly, even though only one rivet is used, the rotation of the upper plate member 1 and the lower plate member 2 is prevented and joining strength of the upper plate member 1 and the lower plate member 2 is further improved.

In addition, since joining objects are joined by using one rivet, productivity may improve and manufacturing cost may be reduced by reducing the number of joining processes and components.

Since the ribs 50 are formed to the shank portion 30, the contact area of the entire rivet 100 may be increased, so shear strength of the rivet 100 with respect to the upper and lower plate members 1 and 2 may be enhanced, joining load and press capacity may be reduced, and accordingly operating stability of the self-piercing rivet system may be enhanced.

In one or more exemplary embodiments, since the plate-type die 6 provided with the receiving portion 8 may be applied for just supporting the upper and lower plate members 1 and 2, an anvil in a conventional art for the rivet to be deformed outwardly may not be required. Accordingly interference with other equipment may be minimized and design freedom of the riveting process may be improved.

Meanwhile, since the rivet 100 is rotated along the spiral direction due to the ribs 50 so as to integrally join the upper and lower plate members 1 and 2, if opposite direction torque of the joining force of the ribs 50 with respect to the joining objects is applied, the rivet 100 may be separated from the joining objects.

Thus, in one or more exemplary embodiments, if it is required to separate the joining objects from each other, the rivet may be easily separated without being dismantled or tearing the riveting portion, so the joining objects may be recycled.

Figure 6:
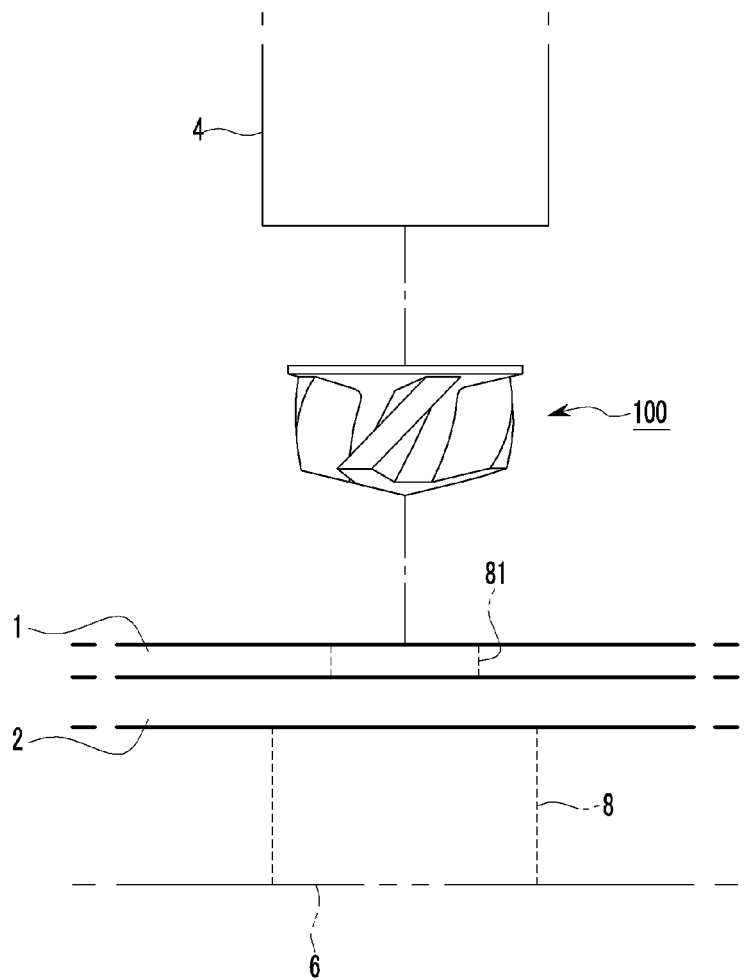
FIG. 6 and FIG. 7 are drawings showing a self-piercing rivet according to another exemplary embodiment of the present invention.
Figure 7:
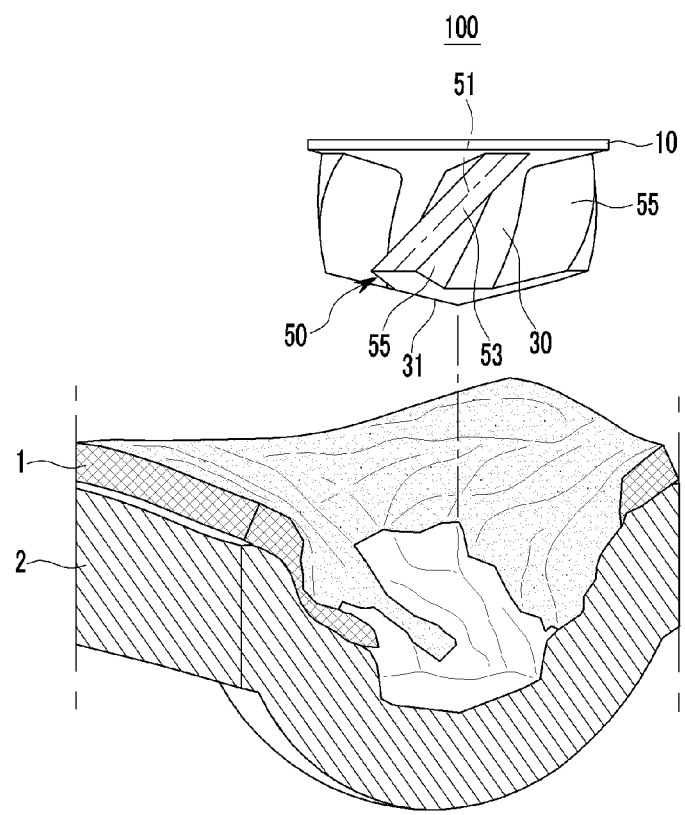

FIG. 6 and FIG. 7 are drawings showing a self-piercing rivet according to another exemplary embodiment of the present invention.

Referring to FIG. 6 and FIG. 7, in one or more exemplary embodiments, the self-piercing rivet 100 is applicable to joining objects of which a hole is formed to at least one riveting target portion of the upper and lower plate members 1 and 2 overlapping each other.

In the drawings, although a hole 81 is formed to the riveting target portion of upper plate member 1, it is not limited thereto. On the contrary, the hole 81 may be formed to the lower plate member 2.

However, it will be described that the hole 81 is formed to the upper plate members as an exemplary embodiment.

The riveting target portion of the upper and lower plate members 1 and 2 is disposed on the receiving portion of the die 6.

In one or more exemplary embodiments, the shank portion 30 and the ribs 50 of the rivet 100 deform the riveting target portion of the upper and lower plate members 1 and 2 and the ends of the ribs 50 pierce an edge of the hole 81 during rotation.

Then the ends of the ribs 50 pierce the riveting target portion of the lower plate member 2, and are deformed plastically and encapsulated within the lower plate member 2.

In one or more exemplary embodiments, the self-piercing rivet 100 is applicable to joining objects of which a hole is formed to at least one riveting target portion of the upper and lower plate members 1 and 2 overlapping each other so that applicable objects of the self-piercing rivet 100 may be widened.

In one or more exemplary embodiments, the deformed riveting target portion of the upper and lower plate members 1 and 2 may be protruded from the lower surface of lower plate member 2 and received within the receiving portion 8 of the die 6.

The operation and effect of the self-piercing rivet 100 according to the current exemplary embodiment of the present invention are the same as the above-stated operation and effect, and thus repeated description will be omitted.

Figure 8:
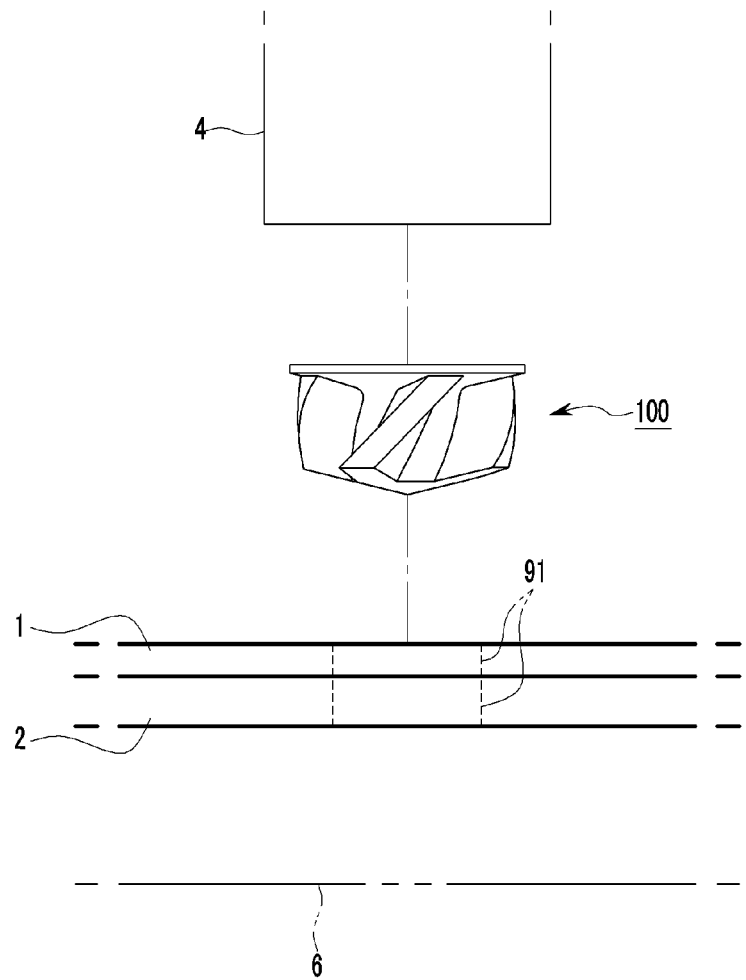
FIG. 8 and FIG. 9 are drawings showing a self-piercing rivet according to another exemplary embodiment of the present invention.
Figure 9:
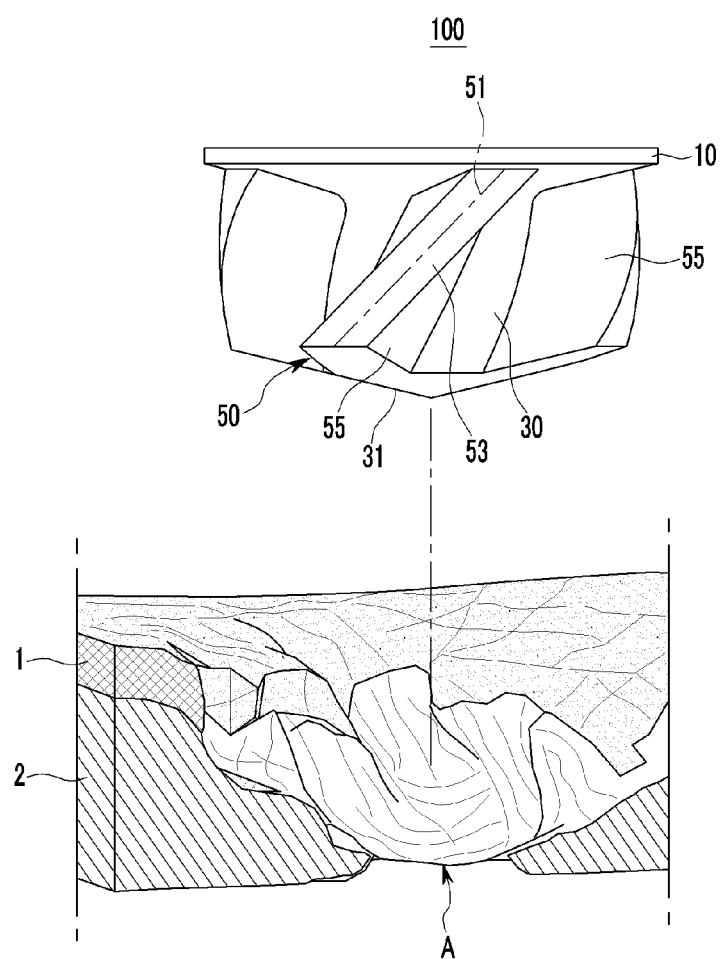

FIG. 8 and FIG. 9 are drawings showing a self-piercing rivet according to another exemplary embodiment of the present invention.

Referring to FIG. 8 and FIG. 9, in one or more exemplary embodiments, the self-piercing rivet 100 is applicable to joining objects of which holes are formed to the riveting target portions of the upper and lower plate members 1 and 2 overlapping each other.

In this case, the die 6 for supporting the riveting target portion of the upper and lower plate members 1 and 2 is plate type without a receiving portion such as a hole or groove.

In one or more exemplary embodiments, the ribs 50 of the rivet 100 tear the edge of the riveting target portion of the upper and lower plate members 1 and 2. And the ends of the ribs 50 pierce an edge of the hole of the lower plate members 2, and are plastically deformed and encapsulated within the lower plate members 2.

In one or more exemplary embodiments, the self-piercing rivet 100 is applicable to joining objects of which holes are formed to each riveting target portion of the upper and lower plate members 1 and 2 overlapping each other so that applicable objects of the self-piercing rivet 100 may be widened.

Also, since the self-piercing rivet 100 is applicable to joining objects of which holes are formed to each riveting target portion of the upper and lower plate members 1 and 2 overlapping each other, the die 6 may be a flat type without a receiving hole. And the ribs 50, inserted into a hole 91, may form a flat surface to a lower surface of the lower plate member 2.

That is, the rivet 100 may form a flat surface to a lower portion of the joining objects, referring to "A" shown in FIG. 9. Therefore, the rivet 100 may satisfy needs of the vehicle manufacturing industry which prefers joining objects without protrusions.

In an exemplary embodiment of the present invention, a hole is not formed to the die 6 in the drawing, but it is not limited thereto. On the contrary, a hole may be formed to the die 6 for receiving the protruded portion of the joining objects.

The operation and effect of the self-piercing rivet 100 according to the current exemplary embodiment of the present invention are the same as the above-stated operation and effect, and thus repeated description will be omitted.

Figure 10:
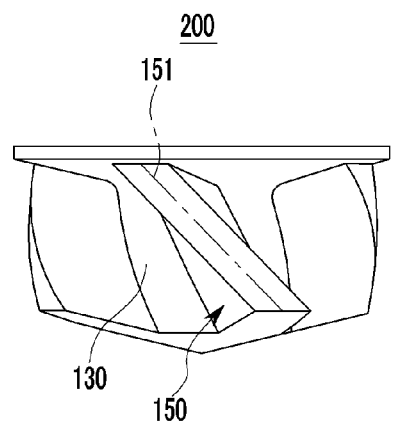
FIG. 10 is a front view of a self-piercing rivet according to another exemplary embodiment of the present invention.

FIG. 10 is a front view of a self-piercing rivet according to another exemplary embodiment of the present invention.

Referring to FIG. 10, in another exemplary embodiment of the present invention, a self-piercing rivet 200 is provided with ribs 150 formed along the length direction of a shank portion 130 with a spiral 151 in an anti-clockwise direction.

In an exemplary embodiment of the present invention, the ribs 150 form the spiral 151 in the anti-clockwise direction from a connecting end to a free end of the shank portion 130.

If one rivet 200 is used for connecting the joining objects and some load of a clockwise direction or an anti-clockwise direction is applied, the rivet 100 may be separated with respect to the joining objects. And thus the spiral may be formed along the clockwise direction or anti-clockwise direction for preventing separation of the rivet 100 considering a load that may be applied to the rivet 100.

The operation and effect of the self-piercing rivet 200 according to the current exemplary embodiment of the present invention are the same as the above-stated operation and effect, and thus repeated description will be omitted.

Figure 11:
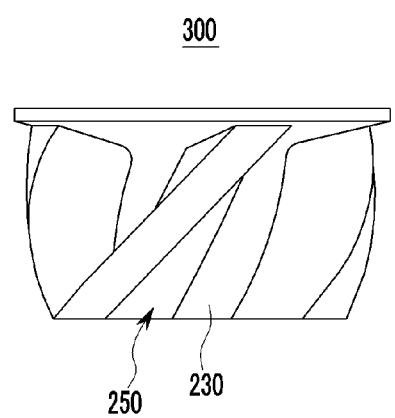
FIG. 11 is a front view of a self-piercing rivet according to another exemplary embodiment of the present invention.

FIG. 11 is a front view of a self-piercing rivet according to another exemplary embodiment of the present invention.

Referring to FIG. 11, in another exemplary embodiment, a shank portion 230 of a self-piercing rivet 300 may have a flat surface at a free end.

In the current exemplary embodiment, since the free end of the shank portion 230 is flat, the relative length of ribs 250 may be elongated.

That is, since the ribs 250 are formed from the connecting end to the free end of the shank portion 230, the ribs 250 may be longer than ribs that are formed to a shank having a protruded surface at a free end.

With the elongated ribs 250, friction area of the ribs 250 with respect to the joining objects may be increased, so that joining performance of the joining objects may be improved.

The operation and effect of the self-piercing rivet 300 according to the current exemplary embodiment of the present invention are the same as the above-stated operation and effect, and thus repeated description will be omitted.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A self-piercing rivet comprising:
   a head portion;
   a shank portion integrally connected with the head portion; and
   a plurality of ribs formed to an external circumferential surface of the shank portion along a length direction of the shank portion in a spiral form,
   wherein:
   the shank portion has a connecting end connected to the head portion and a free end being an opposite end of the connecting end;
   the ribs are formed from the connecting end to the free end in a spiral form;
   each rib has a rib surface with width (B) and side surfaces with thickness (T) between the external circumferential surface of the shank portion and the rib surface; and
   the thickness (T) is larger than the width (B).

2. The self-piercing rivet of claim 1, wherein the ribs are integrally connected with the head portion and are disposed at the external circumferential surface of the shank portion with an even distance therebetween.

3. The self-piercing rivet of claim 1, wherein the shank portion is a solid circular cylinder.

4. The self-piercing rivet of claim 1, wherein the free end of the shank portion is flat.

5. The self-piercing rivet of claim 1, wherein the free end of the shank portion is formed as a cone.

6. The self-piercing rivet of claim 1, wherein the thickness (T) satisfies relationship with an exterior diameter (D) of the shank portion as $T=\{(1/2.66)-1/2\}D$.

7. The self-piercing rivet of claim 1, wherein the ribs are adapted to be rotated along the length direction of the shank portion in a clockwise direction in a spiral form.

8. The self-piercing rivet of claim 1, wherein the ribs are adapted to be rotated along the length direction of the shank portion in a counterclockwise direction in a spiral form.

9. The self-piercing rivet of claim 1, wherein:
   the self-piercing rivet is capable of plastically deforming riveting target portions of an upper plate member and a lower plate member overlapped with each other and integrally joined; and
   the ribs are adapted to be rotated and pierce the upper plate member such that the ribs are plastically deformed within the lower plate member.

10. The self-piercing rivet of claim 9, wherein the self-piercing rivet is adapted to be rotated according to the ribs along a spiral direction during piercing such that the upper and lower plate members are integrally joined by the rotation of the self-piercing rivet.

11. The self-piercing rivet of claim 10, wherein the self-piercing rivet is adapted to be separated from the riveting target portion of the upper and lower plate members by a torque applied to the opposite spiral direction of the ribs.

12. The self-piercing rivet of claim 9, wherein a helix of the ribs and an axial line of the shank portion is between 10-45°.

13. The self-piercing rivet of claim 1, wherein an upper plate member and a lower plate member that are to be joined are made of the same materials.

14. The self-piercing rivet of claim 1, wherein an upper plate member and a lower plate member that are to be joined are made of different materials.

15. A self-piercing rivet that is capable of integrally joining an upper plate member and a lower plate member overlapping each other, comprising:
   a head portion;
   a shank portion integrally connected with the head portion and having a connecting end connected to the head portion and a free end being an opposite end of the connecting end; and
   a plurality of ribs formed to an external circumferential surface of the shank portion from the connecting end to the free end in a spiral form,
   wherein:
   a riveting target portion of the upper and lower plate members includes at least one hole;
   the self-piercing rivet is capable of plastically deforming riveting target portions of the upper plate member and the lower plate member that are overlapped with each other to be integrally joined;

the ribs are adapted to be rotated and to tear the edge of the at least one hole such that the ribs are plastically deformed within the other targeting portion;

each rib has a rib surface with width (B) and side surfaces with thickness (T) between the external circumferential surface of the shank portion and the rib surface; and the thickness (T) is larger than the width (B).

16. A self-piercing rivet that is capable of integrally joining an upper plate member and a lower plate member overlapping each other, comprising:

a head portion;

a shank portion integrally connected with the head portion and having a connecting end connected to the head portion and a free end being an opposite end of the connecting end; and a plurality of ribs formed to an external circumferential surface of the shank portion from the connecting end to the free end in a spiral form, wherein:

each riveting targeting portion of the upper and lower plate members includes holes;

the ribs are adapted to be rotated and to tear the edge of the hole of the upper plate member;

the ribs are further adapted to pierce an interior circumference of the edge of the hole of the lower plate member such that the ribs are plastically deformed within the lower plate member;

each rib has a rib surface with width (B) and side surfaces with thickness (T) between the external circumferential surface of the shank portion and the rib surface; and the thickness (T) is larger than the width (B).

17. The self-piercing rivet of claim 16, wherein:

the ribs are capable of piercing the upper and lower plate members; and the ribs are further adapted to form a flat surface to a lower surface of the lower plate member by piercing the upper and lower plate members.

* * * * *